United States Patent
Mori et al.

(10) Patent No.: US 7,864,228 B2
(45) Date of Patent: Jan. 4, 2011

(54) IMAGE PICKUP APPARATUS FOR PHOTOGRAPHING DESIRED AREA IN IMAGE WITH HIGH IMAGE QUALITY AND CONTROL METHOD FOR CONTROLLING THE APPARATUS

(75) Inventors: Katsuhiko Mori, Kawasaki (JP);
Masakazu Matsugu, Chiba (JP);
Yusuke Mitarai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 815 days.

(21) Appl. No.: 11/258,694

(22) Filed: Oct. 25, 2005

(65) Prior Publication Data
US 2006/0092307 A1 May 4, 2006

(30) Foreign Application Priority Data
Oct. 26, 2004 (JP) ............... 2004-311038

(51) Int. Cl.
*H04N 5/262* (2006.01)
*H04N 5/222* (2006.01)
(52) U.S. Cl. .............. 348/240.99; 348/333.12
(58) Field of Classification Search .............. 348/222.1, 348/223, 229.1, 345, 361, 362
See application file for complete search history.

(56) References Cited

U.S. PATENT DOCUMENTS

| | | | |
|---|---|---|---|
| 4,965,443 A | 10/1990 | Yamasaki | |
| 4,978,990 A | 12/1990 | Yamasaki | |
| 6,266,085 B1 * | 7/2001 | Kato et al. | 348/211.7 |
| 6,853,401 B2 * | 2/2005 | Fujii et al. | 348/223.1 |
| 6,906,746 B2 * | 6/2005 | Hijishiri et al. | 348/240.2 |
| 7,148,922 B2 * | 12/2006 | Shimada | 348/224.1 |
| 7,248,294 B2 * | 7/2007 | Slatter | 348/240.99 |
| 7,397,502 B2 * | 7/2008 | Shiraishi | 348/223.1 |
| 2003/0071907 A1 * | 4/2003 | Karasaki et al. | 348/333.01 |
| 2004/0125220 A1 * | 7/2004 | Fukuda et al. | 348/234 |

FOREIGN PATENT DOCUMENTS

| | | |
|---|---|---|
| JP | 2-096707 A | 4/1990 |
| JP | 2-096725 A | 4/1990 |
| JP | 6-233165 A | 8/1994 |
| JP | 7-107505 A | 4/1995 |
| JP | 8-279958 A | 10/1996 |
| JP | 2001-249374 A | 9/2001 |

\* cited by examiner

*Primary Examiner*—Lin Ye
*Assistant Examiner*—Trung Diep
(74) *Attorney, Agent, or Firm*—Canon, U.S.A., Inc. I.P. Division (57) ABSTRACT

An object area in an image is determined, and an area image representing the object area is superimposed on the object in the image. In this image, an area to be photographed with high quality is specified using the area image, and a control parameter for controlling an image pickup unit is adjusted so that the quality level of an image within the area to be photographed with high quality is increased to a desired level. Thus, when photographing an image, an area to be photographed with high quality can be easily set in the image.

8 Claims, 6 Drawing Sheets

IMAGE PICKUP APPARATUS FOR PHOTOGRAPHING DESIRED AREA IN IMAGE WITH HIGH IMAGE QUALITY AND CONTROL METHOD FOR CONTROLLING THE APPARATUS

BACKGROUND OF THE INVENTION

1. Field of the Invention

The present invention relates to an image pickup apparatus for photographing a desired area in an image at high image quality, and to a control method for controlling the image pickup apparatus.

2. Description of the Related Art

In known image pickup apparatuses, such as digital cameras and video cameras, functions including auto focus (AF), auto exposure (AE), and auto white balance (AWB) functions are performed on the basis of brightness and color at a predetermined position on the screen.

On the other hand, there is a technique in which a screen is divided into a plurality of areas and, using the average of a pixel value of each area and a threshold value, exposure is controlled by adjusting the exposure to that of areas of low brightness. This technique thus allows backlight compensation regardless of where an object is located (for example, see Japanese Patent Laid-Open No. 2001-249374).

However, this technique does not always ensure that the object can be photographed at high image quality, because the backlight compensation may be performed by adjusting the exposure to that of dark areas outside the object. Therefore, the location and size of the object need to be detected to photograph the object at high image quality.

There are some techniques for detecting and processing an object in an image. For example, there is a technique that uses a neural network to detect an object in an image, and controls exposure using the brightness value of only the area within the detected object (for example, see Japanese Patent No. 2793817). There is another technique that uses a neural network to detect an object in an image, and determines the focus through a hill-climbing servo technique using the brightness value of only the area within the detected object (for example, see Japanese Patent No. 2761391). In addition, there is a technique in which the photographer specifies an object, an area is determined using color information of the object, and auto exposure (AE) and the like are performed using picture signals from the area (for example, see Japanese Patent Laid-Open No. 7-107505).

However, even if an object is detected and the exposure and focus are controlled using only the brightness value of the object, it cannot always be ensured that images of a quality desired by the photographer can be obtained. For example, exposure control performed by adjusting the exposure to that of a backlit object in an image may cause overexposure in an area outside the object within the image. If someone takes photos on a trip, it is normally expected that background scenery, as well as the object, can be photographed with high quality. Therefore, even if clear images of someone and their friend appear on a photo, it cannot be described as a "good" photo unless their background is well photographed.

To solve problems such as those described above, a technique is used to specify the limit of exposure compensation, and maintain an appropriate balance, on the entire screen, between the exposure state of an object selected by the photographer and the exposure state of the surrounding object (for example, see Japanese Patent Laid-Open No. 8-279958). Another technique requires the photographer to roughly define a camera-to-object distance, and allows focusing on a plurality of objects, including the target object, located within a predetermined range around the camera-to-object distance defined by the photographer (for example, see Japanese Patent Laid-Open No. 6-233165). However, this technique requires the photographer to set the location of the object and enter the distance and the like, and thus causes inconvenience for the photographer.

SUMMARY OF THE INVENTION

At least one exemplary embodiment is directed to provide an image pickup apparatus and method that allow easy setting of an area to be photographed with high quality when photographing an image including a main object.

According to one aspect, at least one exemplary embodiment relates to an image pickup apparatus comprising an image pickup unit; an area-detecting unit for detecting an area indicating a predetermined object in an image picked up by the image pickup unit; a display unit for superimposing an area image representing the area detected by the area-detecting unit on the predetermined object in the image picked up by the image pickup unit; an area-defining unit for specifying, using the area image, a desired area in the image displayed by the display unit; a parameter adjustment unit for adjusting a parameter for controlling the image pickup unit, on the basis of a pixel value of the area specified by the area-defining unit, so as to increase the quality of an image within the area to a desired level; and a control unit for controlling the image pickup unit on the basis of the parameter adjusted by the parameter adjustment unit.

According to another aspect, at least one exemplary embodiment relates to a control method for controlling an image pickup apparatus including an image pickup system and a display unit, the method comprising an area-detecting step of detecting an area indicating a predetermined object in an image picked up by the image pickup system; a display step of superimposing, on the display unit, an area image representing the detected area on the predetermined object in the picked-up image; an area-defining step of specifying, using the area image, a desired area in the image displayed by the display section; a parameter adjustment step of adjusting a parameter for controlling the image pickup system, on the basis of a pixel value of the area specified in the area-defining step, so as to increase the quality of an image within the area to be a desired level; and a control step of controlling the image pickup system on the basis of the parameter adjusted in the parameter adjustment step.

Other features besides those discussed above shall be apparent to those skilled in the art from the description the exemplary embodiments of the invention which follows. In the description, reference is made to accompanying drawings, which form a part thereof, and which illustrate an example of exemplary embodiments. Such examples, however, are not exhaustive of the various exemplary embodiments of the invention.

DESCRIPTION OF THE EMBODIMENTS

Embodiments of the present invention will now be described in detail with reference to the attached drawings.

First Embodiment

Figure 1:
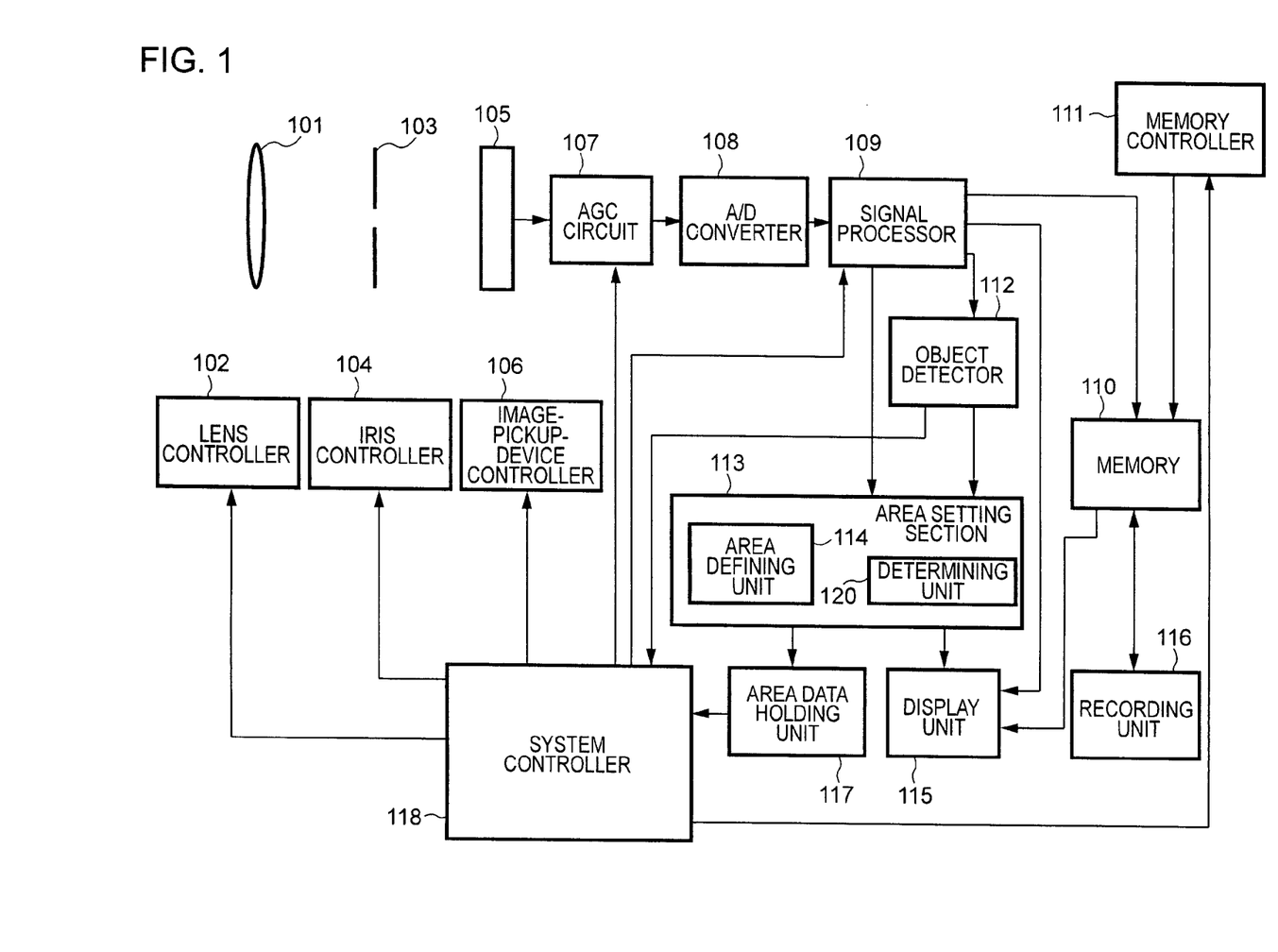
FIG. 1 shows the basic structure of an image pickup apparatus according to a first embodiment.

FIG. 1 shows the basic structure of the image pickup apparatus according to the first embodiment. The image pickup apparatus of the present embodiment is a so-called digital camera that internally stores picked-up images as digital data.

As shown in FIG. 1, the image pickup apparatus of the present embodiment includes an image-pickup lens group 101, a lens controller 102, an iris mechanism 103, an iris controller 104 that controls the iris mechanism 103, and an image pickup device 105, such as a charge-coupled device (CCD). An image-pickup-device controller 106 controls a so-called electronic shutter function for controlling storage time while controlling the image pickup device 105 to read out photoelectrically converted picture signals.

An auto gain control (AGC) circuit 107 electrically amplifies picture signals (analog signals) from the image pickup device 105. An analog-to-digital (A/D) converter 108 converts analog signals from the AGC circuit 107 into digital signals. A signal processor 109 performs image processing, such as color signal processing and gamma correction, on digital signals from the A/D converter 108. Data, including digital signals (picture signals) after image processing, is recorded in a memory 110. A memory controller 111 controls the memory 110.

An object detector 112 detects a main object in an image represented by picture signals from the signal processor 109. An area setting section 113 includes an area defining unit 114 and determining unit 120 (described below), and controls a series of operations for determining an area (described below) in the image represented by the picture signals from the signal processor 109. The area defining unit 114 is used for specifying the area (described below), and the determining unit 120 is used to determine the specified area. The display unit 115 superimposes an image for clearly indicating the area set by the area setting section 113 on the image represented by the picture signals from the signal processor 109.

Picture signal data from the signal processor 109 is recorded in a recording unit 116. Data related to the area set by the area setting section 113 is stored in an area-data holding unit 117. A system controller 118 controls the entire image pickup apparatus while controlling the operations of each of the lens controller 102, iris controller 104, image-pickup-device controller 106, AGC circuit 107, signal processor 109, memory controller 111, and so on. The system controller 118 is a computer, such as a central processing unit (CPU).

Processing performed by the image pickup apparatus having the structure shown in FIG. 1 will now be described.

Figure 10:
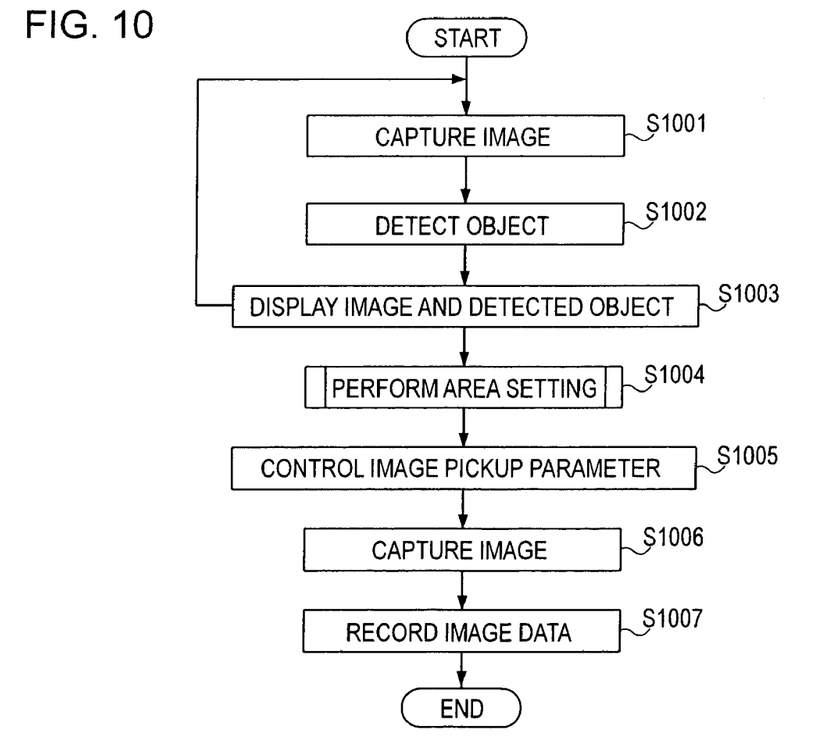
FIG. 10 is a flowchart showing the procedure of processing executed by the image pickup apparatus of the first embodiment.

FIG. 10 is a flowchart showing the procedure of processing executed by the image pickup apparatus of the present embodiment. In this processing, the image pickup apparatus picks up an image of an object, and specifies, in the picked-up image, an area to be photographed with high quality.

First, an image of an object is picked up and the picked-up image is obtained (step S1001). In other words, analog signals inputted via the image-pickup lens group 101, iris mechanism 103, and image pickup device 105 are amplified by the AGC circuit 107 and inputted into the A/D converter 108. The A/D converter 108 converts the amplified analog signals into digital signals, to which image processing, such as color signal processing and gamma correction, is applied. After the image processing, the digital signals (picture signals) are inputted as a "picked-up image" into the memory 110, object detector 112, and area setting section 113.

Next, the object detector 112 detects a predetermined object in the picked-up image and determines the location and size of the area of the detected object in the picked-up image (step S1002). While not being particularly limited thereto, there are some techniques for the object detector 112 to detect the object in the picked-up image. For example, an image of the object is stored as a template, which is compared with an input image. On the basis of the resultant correlation value, the presence, location, and size of the object can be detected. If the object is a human face, proposed techniques using a neural network can be used other than the template matching technique described above. For example, a technique disclosed in Rowley, et al., "Neural Network-Based Face Detection", IEEE Trans. PAMI, January, 1998 can be used. A technique disclosed in Matsugu, et al., "Convolutional Spiking Neural Network Model for Robust Face Detection", ICONIP, 2002 can also be used.

Whichever is used, the object detector 112 determines, in step S1002, the size of a rectangle surrounding the object within the picked-up image, and the location of this rectangle in the picked-up image. While the coordinate values of the upper left and lower right corners of the rectangle are used in the present embodiment, there may be other ways to represent the location of the rectangle.

Next, the display unit 115 superimposes an image representing a frame of the area detected in step S1002 (hereinafter may be referred to as "area image") on the object in the picked-up image (step S1003).

Figure 2:
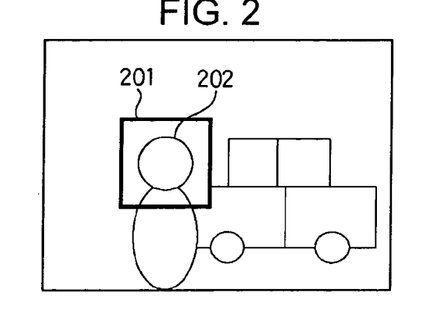
FIG. 2 shows an example of an image displayed on a screen when an object to be photographed is a human face.

FIG. 2 shows an example of an image displayed in step S1003 on a screen of the display unit 115 when the object to be photographed is a human face. As shown, an image (area image) 201 representing a rectangle surrounding an object (human face) 202 is placed on the picked-up image, and is displayed on the screen of the display unit 115. Since the area image 201 superimposed on the picked-up image has the size and location determined in step S1002, the object 202 is present within the frame represented by the area image 201, as shown in FIG. 2. The area image 201, which is a rectangle surrounding the object 202 in FIG. 2, may be a blinking rectangle, or may be displayed in any manner as long as the area image is used to surround the object.

Displaying the area image placed on the object in the picked-up image thus informs the photographer that the image pickup apparatus recognizes the object.

Returning to FIG. 10, the photographer views the image displayed in step S1003 on the screen of the display unit 115, and manipulates the area setting section 113 to set an area to be photographed with high quality (hereinafter may be referred to as "high-quality image area"). In response to the user's request, the image pickup apparatus carries out processing for setting an "area to be photographed with high quality" (high-quality image area) (step S1004).

Specifically, the photographer views the image (including picked-up image and area image) displayed on the display unit 115. Then, if only an area within the frame represented by the area image is to be photographed as a main object, the area within the frame is set as a high-quality image area. The area within the frame represented by the area image may be modified, or another area may be set as a high-quality image area. Then, the photographer manipulates the area setting section 113 to set a high-quality image area.

Figure 5:
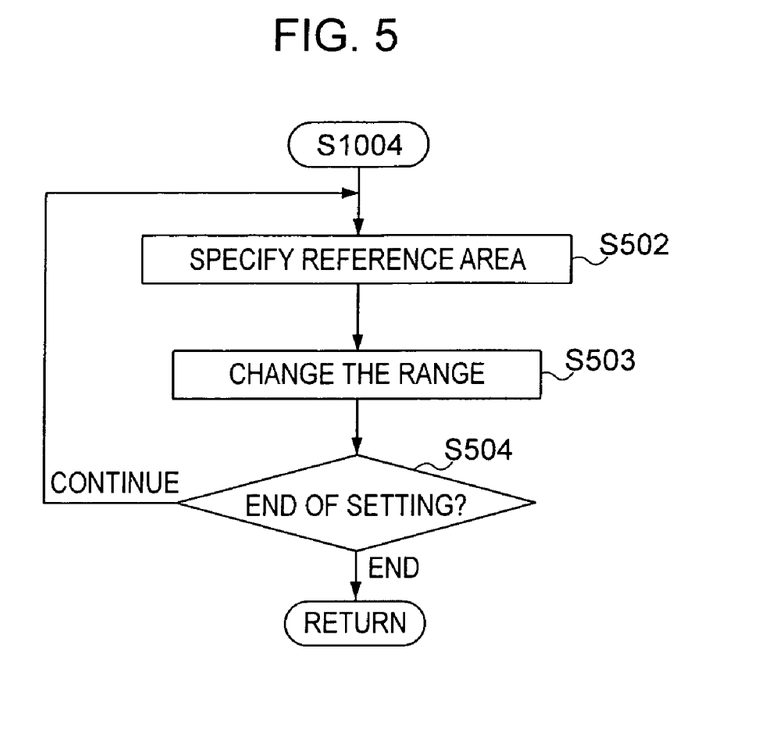
FIG. 5 is a flowchart showing the processing of high-quality image area setting in detail.

FIG. 5 is a flowchart showing the details of high-quality image area setting processing in step S1004.

Figure 3:
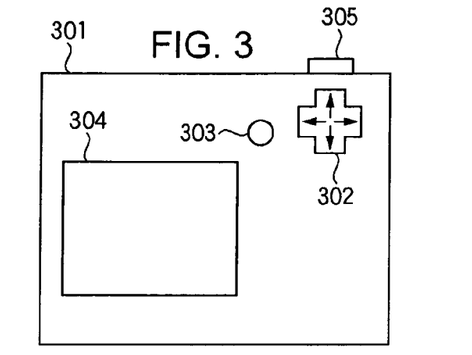
FIG. 3 shows the exterior of the back of the image pickup apparatus.

FIG. 3 shows the exterior of the back of the image pickup apparatus according to the present embodiment. FIGS. 4A to 4F show changes in images displayed on the screen of the display unit 115 when high-quality image areas are set according to the flowchart shown in FIG. 5. The processing shown in FIG. 5 will now be described with reference to FIG. 3 and FIGS. 4A to 4F.

Referring to FIG. 3, a main body 301 of the image pickup apparatus is provided with an arrow key 302, an auxiliary button 303, a liquid crystal display (LCD) 304 as an example of the display unit 115, and a set button 305 as an example of the determining unit 120. The area defining unit 114 in FIG. 1 corresponds to the arrow key 302 and auxiliary button 303 in FIG. 3.

FIG. 4 shows the images of three people and a vehicle appearing on the screen. If "human faces" are the objects to be photographed, those detected by the object detector 112 in step S1002 are faces surrounded by rectangles 401 to 403 shown in FIG. 4A. Therefore, in step S1003, the three rectangles (area images) 401 to 403 surrounding human heads are displayed on the picked-up image as shown in FIG. 4A.

When the photographer selects one of the three rectangles 401 to 403 for the processing described below, the rectangle currently selected is highlighted. For example, the rectangle 401 is highlighted in FIG. 4A. The rectangle currently selected does not necessarily have to be displayed in this manner. For example, allowing the rectangle to blink may distinguish the rectangle currently selected.

Figure 4A:
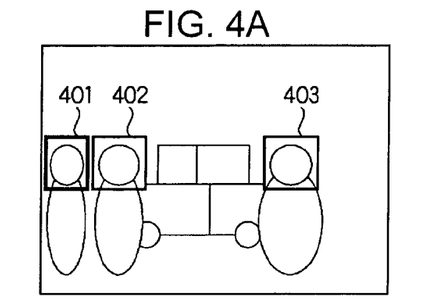
FIGS. 4A to 4F show changes in images displayed on the screen when setting high-quality image areas.

The following will be described based on the assumption that the picked-up image shown in FIG. 4A is displayed on the screen of the display unit 115 in step S1003. However, it will become apparent from the following description that the essence of the following description is not limited to the picked-up image in FIG. 4A.

When the image shown in FIG. 4A is displayed on the screen of the display unit 115, the photographer manipulates the arrow key 302, the auxiliary button 303, and the set button 305 to specify the high-quality image area (step S502). Operations and processing for specifying the high-quality image area will now be described.

Figure 4B:
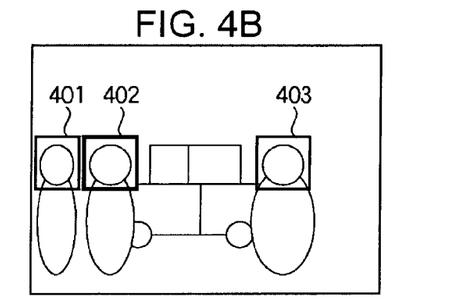

For example, if the photographer views the image (shown in FIG. 4A) displayed on the screen of the display unit 115, and wants to photograph the two people on the right and the vehicle with high image quality, that is, if the photographer wants to specify the area including the two people on the right and the vehicle as a high-quality image area, the photographer initially presses the right portion of the arrow key 302. The system controller 118 detects that the arrow key 302 has been pressed, and allows a rectangle on the immediate right of the currently selected rectangle to be selected. That is, as shown in FIG. 4B, the highlight switches from the rectangle 401 to the rectangle 402. Then, when the photographer presses the set button 305, the system controller 118 detects that the set button 305 has been pressed and sets the currently selected rectangle (rectangle in the middle in FIG. 4B) as a high-quality image area. Next, when the photographer presses the right portion of the arrow key 302 again, the system controller 118 detects that the arrow key 302 has been pressed, and allows a rectangle on the immediate right of the currently selected rectangle to be selected. That is, the highlight switches from the rectangle 402 to the rectangle 403. Then, when the photographer presses the set button 305, the system controller 118 detects that the set button 305 has been pressed, and additionally sets the currently selected rectangle (rectangle on the right end) as a high-quality image area.

Figure 4C:
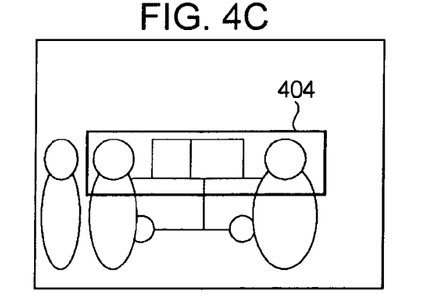
Figure 4D:
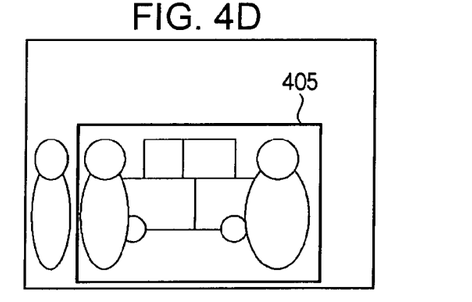

Thus, the above-described operations allow the rectangles in the middle and on the right end to be set as high-quality image areas. Next, the photographer presses the auxiliary button 303. The system controller 118 detects that the auxiliary button 303 has been pressed and, as shown in FIG. 4C, joins the areas represented by the two rectangles specified as high-quality image areas (areas within the rectangles 402 and 403) to form a single rectangle 404. That is, when the system controller 118 detects that the auxiliary button 303 has been pressed, the object detector 112 initially refers to the location of each of the two areas determined in step S1002. Then, the coordinate value of the upper left corner of the rectangle 402 and the coordinate value of the lower right corner of the rectangle 403 are determined as the coordinate value of the upper left corner and the coordinate value of the lower right corner, respectively, of the new high-quality image area.

Then, the system controller 118 causes a frame representing the newly determined high-quality image area to be displayed on the screen of the display unit 115 (with reference to the coordinate values of the upper left and lower right corners of the new high-quality image area).

A plurality of selected rectangles may be joined in any manner as long as, in step S502, a single rectangle containing a group of selected rectangles is created, and the rectangle created is determined as a high-quality image area.

Then if, while holding down the auxiliary button 303, the photographer presses the arrow key 302 in the direction the photographer wants to extend the high-quality image area, the system controller 118 detects that the arrow key 302 has been pressed and extends the previously specified high-quality image area in the direction indicated by the arrow key 302 (step S503). If the under portion of the arrow key 302 is pressed, the high-quality image area indicated by the rectangle 404 in FIG. 4C is extended in the downward direction to form a high-quality image area represented by a rectangle 405 in FIG. 4D.

Every time the high-quality image area is extended, the system controller 118 displays a frame defining the high-quality image area on the screen of the display unit 115 (with reference to the coordinate values of the upper left and lower right corners of the new high-quality image area, the coordinate values varying with the extension of the high-quality image area).

After the high-quality image area is adjusted to the desired size, the photographer presses the set button 305. If it is detected that the set button 305 has been pressed (step S504), the system controller 118 records, in the area-data holding unit 117, data for identifying the specified high-quality image area in the picked-up image. The "data for identifying the specified high-quality image area on the picked-up image" will be described below. Upon completion of the recording of this data, the system controller 118 terminates the area setting according to the procedure shown in FIG. 5, and returns the process to step S1005.

To specify only the faces of two people on the right as the high-quality image areas in the process of the high-quality image area setting, the photographer uses the arrow key 302 to select one of the two faces and presses the set button 305. If it is detected that the set button 305 has been pressed, the system controller 118 specifies the selected rectangle as the high-quality image area (step S502). Next, if the photographer selects the other face using the arrow key 302, the process returns from step S504 to step S502, and the photographer presses the set button 305. If it is detected that the set button 305 has been pressed, the system controller 118 additionally specifies the selected other rectangle as the high-quality image area (step S502).

Figure 4E:
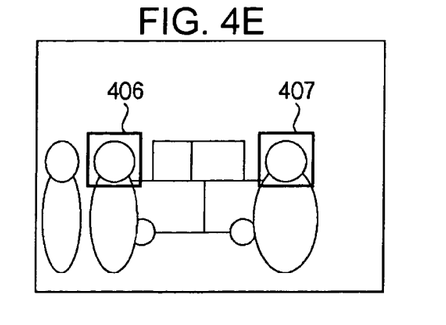

If the photographer presses the set button 305 again (step S504), the setting is completed and, as shown in FIG. 4E, only rectangles 406 and 407 surrounding the respective faces of the two persons on the right are specified as the high-quality image areas. If it is detected that the set button 305 has been pressed, the system controller 118 records, in the area-data holding unit 117, the "data for identifying the specified high-quality image area on the picked-up image" for each of the rectangles (high-quality image areas). Then the system controller 118 terminates the area setting according to the procedure shown in FIG. 5, and returns the process to step S1005.

To specify the entire image of the faces of two people on the right as the high-quality image area in the process of the high-quality image area setting, the photographer uses the arrow key 302 to select one of the two faces and presses the set button 305. If it is detected that the set button 305 has been pressed, the system controller 118 specifies the selected rectangle as the high-quality image area (step S502). Then, while holding down the auxiliary button 303, the photographer presses the arrow key 302 in the direction the photographer wants to extend the high-quality image area. The system controller 118 detects that the arrow key 302 has been pressed and extends the high-quality image area previously set in the direction indicated by the arrow key 302 (step S503).

Then, every time the high-quality image area is extended, the system controller 118 displays a frame defining the high-quality image area on the screen of the display unit 115 (with reference to the coordinate values of the upper left and lower right corners of the new high-quality image area, the coordinate values varying with the extension of the high-quality image area).

Then, if the photographer selects the other face using the arrow key 302, the process returns from step S504 to step S502, and the photographer presses the set button 305. If it is detected that the set button 305 has been pressed, the system controller 118 specifies the selected other rectangle as the high-quality image area (step S502). Then, while holding down the auxiliary button 303, the photographer presses the arrow key 302 in the direction the photographer wants to extend the high-quality image area. The system controller 118 detects that the arrow key 302 has been pressed and extends the high-quality image area specified in step S502 in the direction indicated by the arrow key 302 (step S503).

Every time the high-quality image area is extended, the system controller 118 displays a modified frame defining the high-quality image area on the screen of the display unit 115, with reference to the coordinate values of the upper left and lower right corners of the new high-quality image area, the coordinate values varying with the extension of the high-quality image area.

Figure 4F:
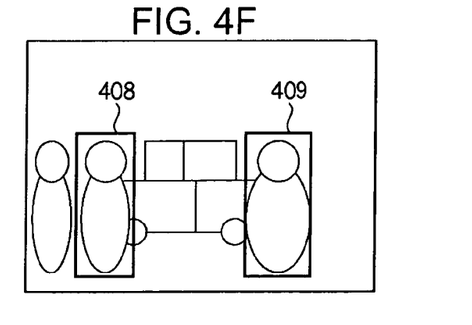

If the photographer presses the set button 305 again (step S504), rectangles 408 and 409 surrounding the respective faces of the two persons on the right are specified as the high-quality image areas, as shown in FIG. 4F. If it is detected that the set button 305 has been pressed, the system controller 118 records, in the area-data holding unit 117, the "data for identifying the specified high-quality image area on the picked-up image" for each of the rectangles (high-quality image areas). Then the system controller 118 terminates the area setting according to the procedure shown in FIG. 5, and returns the process to step S1005.

As described above, since the photographer specifies a high-quality image area by selecting and modifying an object area detected in advance, it is easier to set a high-quality image area than in the case where the photographer defines the size and location of the high-quality image area from the beginning.

It can be generally assumed that the photographer is interested in the object in the image, and thus wants to specify the area in and around the object as the high-quality image area. Therefore, using the object area, as described above, to specify the high-quality image area not only simplifies the setting process, but also is advantageous in that the object area that should be originally specified as a high-quality image area can be included in this high-quality image area in the process of setting the high-quality image area.

The "data for identifying the specified high-quality image area on the picked-up image" will now be described. In the present embodiment, the "data for identifying the specified high-quality image area on the picked-up image" is positional data with respect to the object position detected by the object detector 112.

Figure 6:
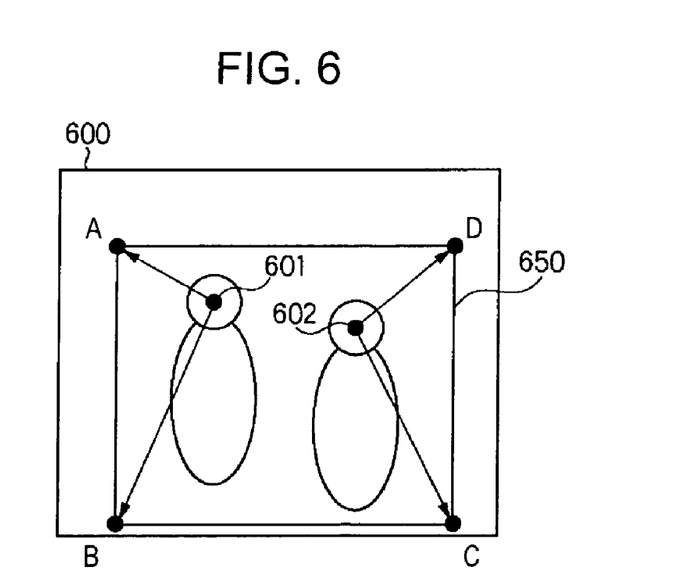
FIG. 6 is a diagram for explaining data for identifying a high-quality image area in a picked-up image.

For example, as shown in FIG. 6, an area 650 is set as a high-quality image area, and object positions (e.g. detected positions and the average coordinate values of four vertices of each rectangle determined in step S1002) 601 and 602 are detected by the object detector 112. In this case, the "data for identifying the high-quality image area 650 on a picked-up image 600" is data indicating the coordinate positions of the four corners (points A, B, C, and D) of the high-quality image area 650 on the picked-up image 600. Specifically, the "data for identifying the high-quality image area 650 on the picked-up image 600" is data indicating a bias from the closer of the two object positions 601 and 602. For example, as for the point A, since the object position 601 is closer to the point A than the object position 602 is, a bias from the coordinate position of the object position 601 to that of the point A is treated as data for the point A. The same applies to the points B, C, and D. FIG. 6 is a diagram for explaining "data for identifying the specified high-quality image area on the picked-up image".

As described above, the "data for identifying the high-quality image area on the picked-up image" is set with respect to each object position. Thus, even if an image previously captured differs from an image currently being captured in such a case, for example, when the photographer or the image pickup apparatus are moved within a range where an image of the main object is within the angle of view, the positional relationship between the main object and high-quality image area can be maintained. That is, even if the photographer, image pickup apparatus, or main object slightly moves during photographing, the positional relationship between the main object and high-quality image area in the image displayed in the LCD 304 can be maintained. On the other hand, if the high-quality image area is managed on the basis of fixed coordinates in the image (for example, with their origin at the upper-left corner of the image), only slight changes in the orientation of the photographer and image pickup apparatus cause the main object and high-quality image area in the image to be displaced from each other. This results in a gap between the specified area and the desired area. Using the object positions detected by the object detector 112 allows area setting regardless of the movement of the photographer, image pickup apparatus, and object during photographing.

As described in FIG. 10, there is a path returning from step S1003 to step S1001. This shows a series of steps where, in a constant cycle, an image is captured, an object is detected, and the result of object detection and the captured image are displayed. Since an image is captured in a constant cycle, an image displayed on the screen of the display unit 115 changes in this cycle. However, even if the image displayed on the screen changes, a desired area can be shown by displaying a frame representing a high-quality image area on a newly picked-up image, since the high-quality image area is set with reference to the result of object detection, as described above.

Returning to FIG. 10, when the high-quality image area is determined by the processing described above, the system controller 118 calculates (controls) an image pickup parameter using pixel values in the high-quality image area (step S1005). The processing in step S1005 will now be described in detail. The system controller 118 causes the lens controller 102 and the iris controller 104 to perform focus control on the high-quality image area, which is specified by the data held in the area-data holding unit 117. At the same time, the system controller 118 causes the signal processor 109 to perform signal processing while controlling the iris controller 104, the image-pickup-device controller 106, and the AGC circuit 107 to perform exposure control.

The focus control involves the extraction of high-frequency content from picture signals in the high-quality image area, and the drive of the focus lenses according to the amount of high-frequency content by using a hill-climbing servo technique. The depth of field is set at the same time.

The exposure control involves the setting of the iris, shutter speed, and AGC for preventing overexposure and underexposure in the high-quality image area. Moreover, the signal processor 109 sets a gamma curve to ensure better contrast in the high-quality image area.

Upon completion of the processing described above, the image pickup apparatus enters wait mode and waits for the photographer to press the shutter button (not shown) in the image pickup apparatus. When the photographer presses the shutter button, the system controller 118 detects that the shutter button has been pressed (step S1006) and records, at the time of detection, image data based on the picture signals obtained from the signal processor 109, in the recording unit 116 (step S1007).

In the description above, a photographer who is not the object to be photographed specifies an area to be photographed with high quality. However, there are cases where, for example, the object himself/herself wants to set an area to be photographed with high quality using the function of self-photographing, or the photographer wants to photograph a particular object with high quality using the same composition as that of an image previously photographed. Techniques used in such cases will now be described.

An image is photographed with the press of a shutter button or with the use of a timer or remote control. The image obtained through the image-pickup lens group 101, the iris mechanism 103, the image pickup device 105, the AGC circuit 107, the A/D converter 108, and the signal processor 109 is temporarily stored in the memory 110. After being subjected to compression and the like, the image is ultimately recorded in the recording unit 116. To display the recorded image on the display unit 115, the image is temporarily expanded in the memory 110, read out by the memory controller 111, and then displayed on the display unit 115. The temporarily recorded image is used in setting a high-quality image area for self-photographing or the like. That is, after an image is photographed using almost the same composition as that of the image photographed after the setting of the high-quality image area, an area to be photographed with high quality is set on the basis of the image photographed.

Displaying on the display unit 115 an image recorded in the recording unit 116 is basically the same as displaying on the display unit 115 an image currently being captured. The only difference is that the recorded image is not updated while the image currently being captured is periodically updated. When playing back the recorded image, as described above, the image is temporarily expanded in the memory 110 and then displayed on the display unit 115. At the same time, the image expanded in the memory 110 is inputted into the object detector 112. As described above, the object detector 112 detects an object and determines the location and size of the object area.

Then, a frame for the object, together with the image expanded in the memory 110, are displayed on the display unit 115. That is, the image currently being captured and the image recorded are the same in that they both are the images displayed on the display unit 115, and that their frames both surround the objects.

According to the procedure described above, an area to be photographed with high quality is set using the area defining unit 114, and area data is stored in the area-data holding unit 117. Similar to that described above, this area data is positional data based on the position of the object. Then, the image pickup apparatus is placed in photographing mode, an image is photographed using the same composition as that used previously. If the location of the image pickup apparatus is changed after one shot, it is generally extremely difficult to set the location and orientation of the image pickup apparatus such that the image is photographed in exactly the same manner as that in the initial shot. However, the area data stored in the area-data holding unit 117 is set with respect to the object position. Since an area can be specified with respect to the object position, robustness against variations in the location of the image pickup apparatus can be achieved.

Then, the system controller 118 uses the area data set on the basis of the image recorded on the recording unit 116 and stored in the area-data holding unit 117 to perform focus control and exposure control as described above so that a desired image can be photographed.

The object detector 112 described above may be implemented, for example, via a circuit, microprocessing unit (MPU), digital signal processor (DSP), or software. Processing functions for the object detection may be implemented by sharing them among a circuit, MPU, DSP, and software. The signal processor 109 and other components can also be implemented through several mechanisms.

Second Embodiment

Figure 7:
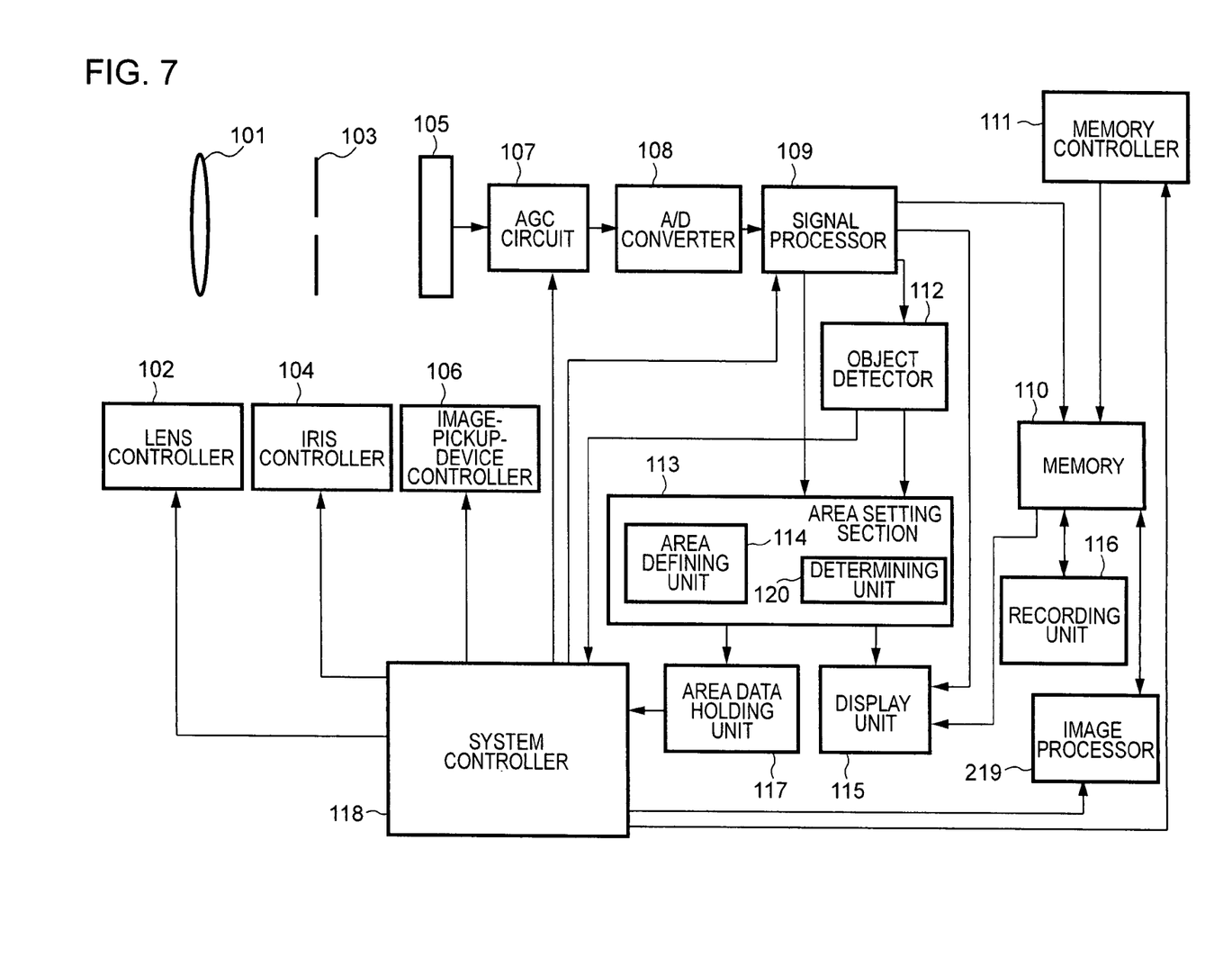
FIG. 7 is a block diagram showing the basic structure of an image pickup apparatus according to a second embodiment.

FIG. 7 is a block diagram showing the basic structure of an image pickup apparatus according to the second embodiment. Components that are identical to those in FIG. 1 are given the same reference numerals and their description will be omitted here. As shown in FIG. 7, an image processor 219 is added to the basic structure of the image pickup apparatus of the first embodiment to form the basic structure of the image pickup apparatus of the present embodiment.

A description associated with the operations of the image processor 219 will be given below. The operations of the other components are the same as those in the first embodiment.

In the first embodiment, the exposure control performed by the system controller 118 involves gamma curve correction and the setting of iris, shutter speed, and AGC. In the present embodiment, digital processing is also performed on an image transmitted through the image-pickup lens group 101, iris mechanism 103, image pickup device 105, AGC circuit 107, A/D converter 108, and signal processor 109 and stored in the memory 110. A desired image quality, in terms of exposure, focusing, color, contrast, and the like, can thus be achieved.

The image processor 219 operates in response to control signals from the system controller 118. When image data of the high-quality image area is inputted from the image stored in the memory 110, the image processor 219, for example, increases the brightness value of the area corresponding to the inputted image data. Then, the result is returned to the memory 110, where the image processed by the image processor 219 is stored.

This processing will now be described in detail. Similar to the first embodiment, data is recorded in the area-data holding unit 117, the system controller 118 performs various control and processing operations on the basis of the data, and the resultant image to be subsequently photographed is stored in the memory 110. Next, in the present embodiment, the system controller 118 outputs control signals to the image processor 219 to cause the image processor 219 to operate. At the same time, the system controller 118 controls the memory controller 111 so that image data of the high-quality image area is outputted, on the basis of the positional information of the object within the image and the data stored in the area-data holding unit 117, from the image stored in the memory 110 to the image processor 219. The image processor 219 performs image processing on the inputted image data.

This image processing involves brightness correction, edge enhancement, and color correction to the high-quality image area. That is, in addition to the focus control and exposure control described in the first embodiment, brightness correction and color correction are performed as partial exposure correction. Edge enhancement is also performed as similar focusing correction. These processing operations correspond to the image-pickup parameter control performed on a part of the image as described in the first embodiment.

Such correction performed only on the high-quality image area causes unevenness in the quality of the entire image. It is thus necessary to perform correction on the area around the high-quality image area while gradually reducing the amount of correction according to the distance from the high-quality image area. Such correction performed on a specific area is implemented as one of the functions of retouching software running on a personal computer (PC), for example, as a function called "dodge-and-burn" function. However, in such software, for example, an image photographed with a digital camera is transferred to a PC, where a user independently designates, with a mouse, from the image an area to be corrected, thereby performing various correction operations on the selected area.

On the other hand, in the present embodiment, the object detector 112 detects the object, an area to be photographed with high quality is set, on the basis of the detected object area, according to the method described in the first embodiment, and processing is thus performed on the area. That is, in the present embodiment, correction is not performed on the area designated independently by the user with viewing a photographed image, but is performed on the area specified on the basis of the result of object detection.

The image data is outputted from the image processor 219 after the above-described correction operations are performed thereon, and stored in the memory 110 again according to control by the memory controller 111. The corrected image stored in the memory 110 is compressed and recorded as a compressed image on the recording unit 116.

Third Embodiment

Figure 8:
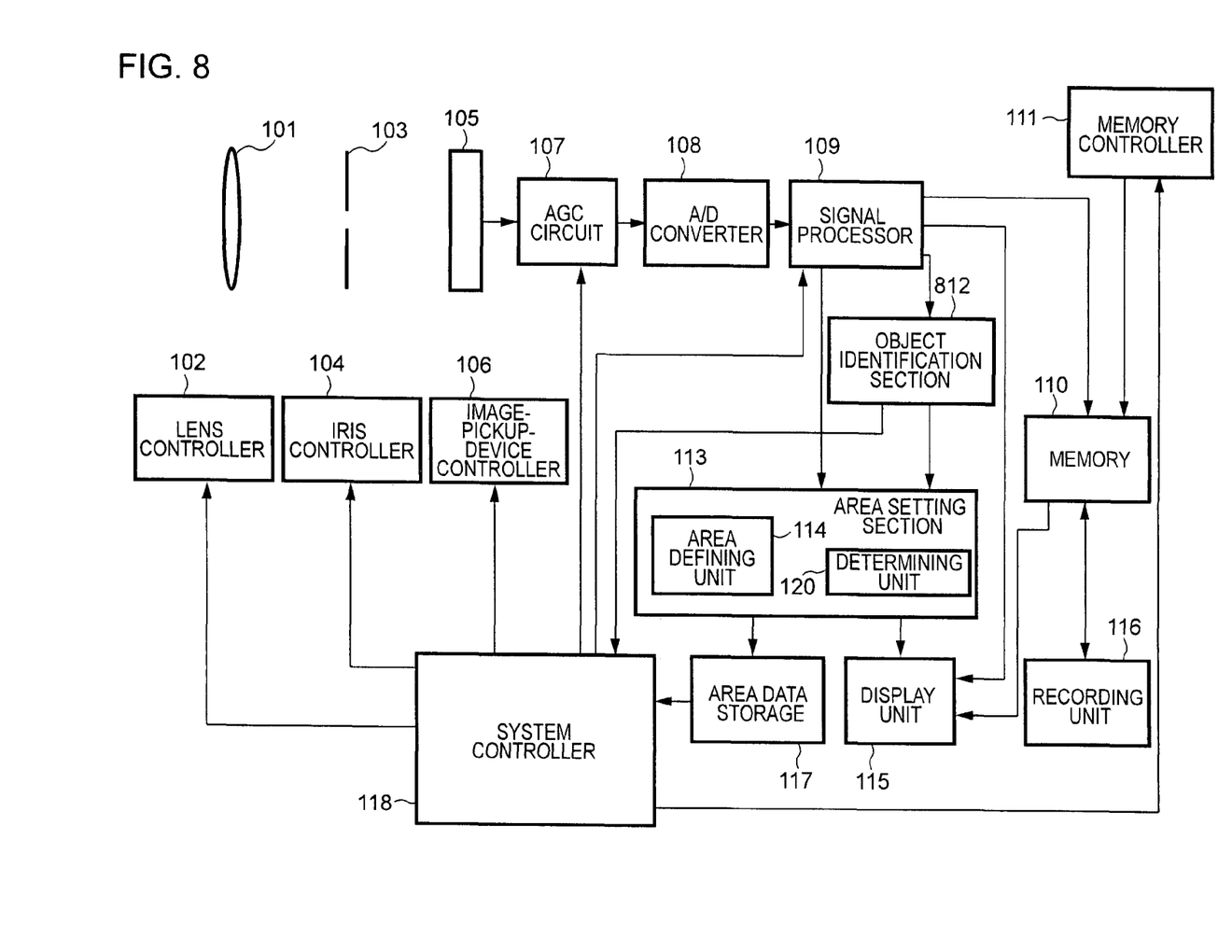
FIG. 8 is a block diagram showing the basic structure of an image pickup apparatus according to a third embodiment.

FIG. 8 is a block diagram showing the basic structure of an image pickup apparatus according to the present embodiment. Components that are identical to those in FIG. 1 are given the same reference numerals and their description will be omitted here. Referring to FIG. 8, the object detector 112 in the basic structure of the image pickup apparatus of the first embodiment is replaced with an object identification section 812.

Figure 9:
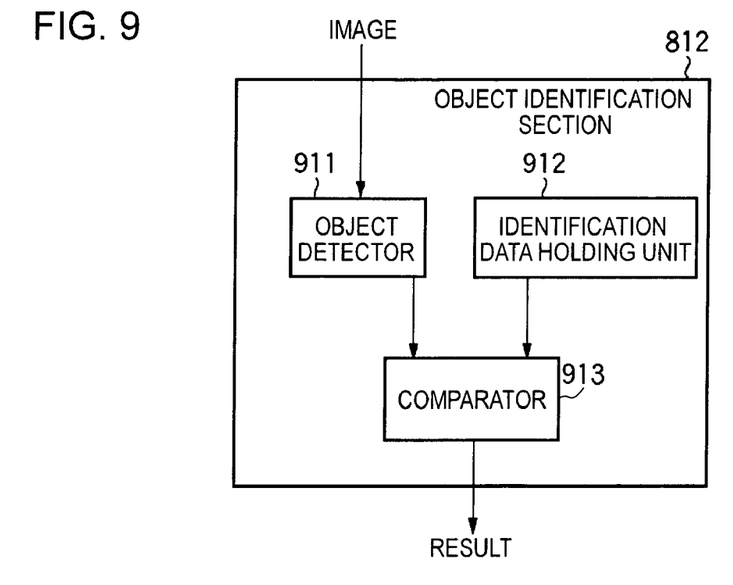
FIG. 9 is a block diagram showing the basic structure of an object identification section.

FIG. 9 is a block diagram showing the basic structure of the object identification section 812, which includes an object detector 911, an identification-data holding unit 912, and a comparator 913. The object identification section 812 and each component shown in FIG. 9 will now be described. The operations of the other components are the same as those described in the first embodiment.

In the first embodiment, all the objects, such as human faces, detected by the object detector 112 are displayed on the display unit 115. Then, with respect to each detected object, whether or not to be included in the high-quality image area is determined. On the other hand, in the present embodiment, a frame is displayed for a predetermined object (specific object) only. For example, if the object is a human face, data for identifying one or more individuals is stored, and the detected object is compared with the stored data. An area image (frame) is displayed for only the object that matches the stored data.

Since, in this case, an image of a stranger captured in the background is not identified as the object, the number of frames that are candidates for selection is reduced, and the setting of a reference area during the high-quality image area setting is simplified. An example of a method for identification is as follows. First, templates corresponding to respective individuals are stored in the identification-data holding unit 912. Then, in the similar manner to that of the object detector 112, the object detector 911 detects objects in an input image. The comparator 913 compares each of the detected objects with a template for each individual, and the resultant correlation value is used for identification.

There is another identification method disclosed in Wiskott, Fellous, et al., "Face Recognition by Elastic Bunch Graph Matching", IEEE Trans. PAMI, July, 1997. In this method, correlation values between the characteristics of respective faces and Gabor functions corresponding to respective individuals are stored in the identification-data holding unit 912. An individual can thus be identified by comparing a correlation value in an input image with the correlation values stored in the identification-data holding unit 912. In this case, the object detector 911 outputs, to the comparator 913, a correlation value between each characteristic and Gabor function together with the result of object detection.

The operation of the object identification section 812 will now be described with reference to FIG. 8 and FIG. 9. A captured image obtained through the image-pickup lens group 101, iris mechanism 103, image pickup device 105, AGC circuit 107, A/D converter 108, and signal processor 109 that are shown in FIG. 8 is inputted to the object identification section 812 while being displayed on the screen of the display unit 115.

As described above, the object identification section 812 includes the object detector 911, the identification-data holding unit 912, and the comparator 913. A captured image is inputted into the object detector 911 that performs object detection. Then, the comparator 913 compares the detection result with data stored in the identification-data holding unit 912 to determine whether or not the detection result matches a "specified object" that is stored in the identification-data holding unit 912. The comparison may be performed according to any of the methods described above. If a template image for a "specified object" is stored in the identification-data holding unit 912, the comparator 913 normalizes a partial image having the location and size of the object detected by the object detector 911. The comparator 913 compares the normalized partial image with the template image stored in the identification-data holding unit 912 to determine, on the basis of the resultant correlation value, whether or not the object in the input image matches the specified object. If values, such as the results of convolution between object characteristics and some kernels, are stored in the identification-data holding unit 912, the result of convolution between an image obtained by normalizing the partial image of the object detected by the object detector 911 and its kernel is compared with the convolution result stored in the identification-data holding unit 912. Thus, it is determined whether or not the object in the input image matches the specified object.

On the basis of this determination, a frame is displayed only for the object that matches the specified object. The subsequent operations are the same as those in the first and second embodiments.

While the arrow key and buttons of the image pickup apparatus are used in the embodiments described above, the operation method and the user interface are not limited to these, and various modifications can be made.

When capturing an image including a main object, the structures of the above-described embodiments allow an easy setting of an area to be captured with high quality in the image.

Other Embodiment

At least one exemplary embodiment is achieved when, from a recording medium on which software program code for implementing the functions of the above-described embodiments is recorded, a CPU or MPU of a camera or computer reads and executes the program code. In this case, the program code read out from the recording medium implements the functions of the above-described embodiments, and thus, the recording medium on which the program code is recorded constitutes at least one exemplary embodiment.

The above-described embodiments are implemented not only when the camera or computer reads and executes the program code, but also when, according to the program code, an operating system (OS) running on the camera or computer carries out all or part of the actual processing, thus implementing the functions of the above-described embodiments.

The functions of the above-described embodiments are also implemented when the program code read out from the recording medium is written in a function expansion card in the camera or computer, or in a memory of a function expansion unit connected to the camera or computer, and then the function expansion card or a CPU in the function expansion unit carries out all or part of the actual processing according to the program code, thus implementing the functions of the above-described embodiments.

When at least one exemplary embodiment is applied to the recording medium described above, a program code corresponding to the above-described flowchart is stored in the recording medium.

Although the present invention has been described with a certain degree of particularity, many apparently widely different embodiments of the invention can be made without departing from the spirit and the scope thereof. It is to be understood that the invention is not limited to the specific embodiments thereof except as defined in the appended claims.

This application claims the benefit of Japanese Application No. 2004-311038 filed Oct. 26, 2004, which is hereby incorporated by reference herein in its entirety.

What is claimed is:

1. An image pickup apparatus comprising:
    an image pickup unit configured to pickup an image;
    a detecting unit configured to detect a plurality of predetermined objects from an image picked up by the image pickup unit;
    a display unit configured to superimpose a plurality of frames onto said image picked up by the image pickup unit such that each of the plurality of frames surrounds a respective one of the plurality of predetermined objects detected by the detecting unit;
    a selection unit configured to select at least two frames from the plurality of frames in response to a user operating the selection unit;
    an integration unit configured to join the at least two frames selected by said selection unit into a new frame which includes the at least two frames;
    a parameter adjustment unit configured to adjust a parameter for controlling the image pickup unit, based on a pixel value of an image area contained within the new frame, so as to increase the quality of the image area contained within the new frame to a desired level; and
    a control unit configured to control the image pickup unit, based on the parameter adjusted by the parameter adjustment unit, to record data for identifying the image area contained within the new frame.

2. The image pickup apparatus according to claim 1, further comprising a holding unit for determining a location of a desired area in the image displayed by the display unit with respect to at least one frame of said plurality of frames, and holding data indicating the determined location.

3. The image pickup apparatus according to claim 2, further comprising a pixel-value adjustment unit for adjusting, within an image picked up by the image pickup unit controlled by the control unit, a pixel value in an area specified on the basis of data held by the holding unit.

4. The image pickup apparatus according to claim 3, wherein the pixel-value adjustment unit performs at least one of the brightness correction, edge enhancement, and color correction on an image within the desired area.

5. The image pickup apparatus according to claim 1, wherein the parameter adjustment unit adjusts at least one of an iris, shutter speed, AGC gain, gamma curve, and the position of a focus lens.

6. The image pickup apparatus according to claim 1, further comprising an identifying unit for identifying at least one of the predetermined objects, wherein
    the display unit superimposes the frame which surrounds the predetermined object if the predetermined object is identified by the identifying unit as a specific object.

7. A control method for controlling an image pickup system including an image pickup apparatus and a display unit, the method comprising:
    a detecting step of detecting a plurality of predetermined objects in an image picked up by the image pickup system;

a display step of causing the display unit to superimpose a plurality of frames onto the image picked up by the image pickup system such that each frame of the plurality of frames surrounds a respective one of the plurality of predetermined objects detected at the detecting step;

a selection step of selecting at least two frames from the plurality of frames in response to a user operating a selection unit;

an integration step of joining the at least two frames selected by the selection step into a new frame that includes the at least two frames;

a parameter adjustment step of adjusting a parameter for controlling the image pickup system, based on a pixel value of an image area contained within the new frame, so as to increase the quality of the image area contained within the new frame to be a desired level; and a control step of controlling the image pickup system, based on the parameter adjusted in the parameter adjustment step, to record data for identifying the area contained within the new frame.

8. A non-transitory computer-readable storage medium containing computer-executable instructions for controlling an image pickup apparatus including an image pickup system and a display unit, the medium comprising:

computer-executable instructions for detecting a plurality of predetermined objects in an image picked up by the image pickup system;

computer-executable instructions for causing the display unit to superimpose a plurality of frames onto the image picked up by the image pickup system such that each frame of the plurality of frames surrounds a respective one of the plurality of predetermined objects detected under the instructions for detecting;

computer-executable instructions for selecting at least two frames from the plurality of frames in response to a user operating on a selection unit;

computer-executable instructions for joining the at least two frames selected under said instructions for selecting into a new frame which includes the at least two frames;

computer-executable instructions adjusting a parameter for controlling the image pickup system, based on a pixel value of an image area contained within the new frame, so as to increase the quality of the image area contained within the new frame to be a desired level; and computer-executable instructions for controlling the image pickup system, based on the adjusted parameter, to record data for identifying the image area contained within the new frame.

\* \* \* \* \*